(12) United States Patent
Duncan et al.

(10) Patent No.: US 6,721,614 B2
(45) Date of Patent: Apr. 13, 2004

(54) MULTI-DISCIPLINE UNIVERSAL CAD LIBRARY

(75) Inventors: Steven Allen Duncan, Pflugerville, TX (US); Laurence J. McKee, Summerville, SC (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 09/862,103

(22) Filed: May 21, 2001

(65) Prior Publication Data

US 2002/0173867 A1 Nov. 21, 2002

(51) Int. Cl.[7] .............................................. G06F 19/00
(52) U.S. Cl. ............................ 700/97; 700/95; 700/98; 700/182; 345/964; 706/919
(58) Field of Search ........................... 700/97, 182, 98, 700/95; 345/964; 706/919

(56) References Cited

U.S. PATENT DOCUMENTS

| | | | |
|---|---|---|---|
| 5,610,833 A | * 3/1997 | Chang et al. .................. | 716/11 |
| 5,796,986 A | 8/1998 | Fuller | |
| RE36,602 E | 3/2000 | Sebastian et al. | |
| 6,063,128 A | * 5/2000 | Bentley et al. ............... | 345/964 |
| 6,088,625 A | * 7/2000 | Kellstrom, Jr. ............... | 700/97 |
| 6,177,942 B1 | * 1/2001 | Keong et al. .................. | 700/97 |
| 6,385,302 B1 | * 5/2002 | Antonucci et al. ............ | 379/45 |
| 6,445,974 B1 | * 9/2002 | Malaugh et al. .............. | 700/97 |

* cited by examiner

Primary Examiner—Leo Picard
Assistant Examiner—Charles Kasenge
(74) Attorney, Agent, or Firm—Richard M. Ludwin; Cantor Colburn LLP

(57) ABSTRACT

The present invention relates to a system for facilitating design and production engineering processes in a multi-disciplinary computer aided design environment. The system includes first enterprise including a workstation running a CAD application relating to a first engineering discipline; a second workstation running a CAD application relating to a second engineering discipline; a first storage device coupled to the first workstation; a second storage device coupled to the second workstation; a server executing a multi-discipline universal CAD library application; and a network connection for allowing the workstations and the server to communicate. The system also comprises a communications link to a second enterprise for allowing the second enterprise to communicate with the first enterprise. The system also comprises a commercial database accessible to both enterprises via the communications link. The multi-discipline universal CAD library tool utilizes standard component parts definitions to allow the enterprises to share information relating to CAD processes and data over the web.

14 Claims, 2 Drawing Sheets

INTERFACE
UNITS OF FUNCTIONALITY
AS DESCRIBED IN ISO 10303-210

| | |
|---|---|
| ADVANCED BOUNDARY REPRESENTATION | INTERCONNECT MODULE CONNECTION ROUTINE |
| ANALYTICAL MODULE | INTERCONNECT MODULE DESIGN |
| ANALYTICAL REPRESENTATION | INTERCONNECT MODULE EDGE |
| ASSEMBLY BILL OF MATERIAL | INTERCONNECT MODULE USAGE VIEW |
| ASSEMBLY COMPONENT | INTERCONNECT PLACEMENT REQUIREMENTS |
| ASSEMBLY COMPONENT GROUPING | INTERCONNECT SHAPE |
| ASSEMBLY COMPONENT PLACMENT REQUIREMENTS | LAND |
| | LINE |
| ASSEMBLY DESIGN INFO ASSIGNMENT TO USAGE VIEW | LIBRARY ITEM |
| | MATERIAL PRODUCT |
| ASSEMBLY INTERFACE COMPONENT | NON TOPOLOGICAL SURFACE |
| ASSEMBLY MARKING | PART TEMPLATE |
| ASSEMBLY MODULE DESIGN | PART TEMPLATE SHAPE |
| ASSEMBLY MODULE USAGE VIEW | PHYSICAL NETWORK |
| ASSEMBLY PHYSICAL INTERFACE REQUIREMENT | PHYSICAL UNIT |
| ASSEMBLY PHYSICAL REQUIREMENT ALLOCATION | PHYSICAL UNIT ANALYTICAL REPRESENTATION |
| | PHYSICAL UNIT SHAPE |
| ASSEMBLY SHAPE | PLANNED CHARACTERISTIC |
| AUTHORIZATION | PLANNED EFFECTIVITY |
| CHARACTERISTIC | POLYLINE |
| CIRCLE | PRINTED PART TEMPLATE |
| COMPOSITE CURVE | PRODUCT IDENTIFICATION |
| DATUM BASED CHARACTERISTIC | REQUIREMENT DECOMPOSITION |
| DOCUMENT | SHAPE |
| END ITEM IDENTIFICATION | SOURCE CONTROL |
| EXTERNAL DEFINITION | STRATUM |
| FABRICATION JOINT | STRATUM FEATURE |
| FORM FEATURES | STRATUM POSITION |
| GEOMETRICALLY BOUNDED 2D WIREFRAME | STYLED CURVE |
| | STYLED TEXT |
| INTER STRATUM FEATURE TEMPLATE | TRIMMED CURVE |
| INTERCONNECT BILL OF MATERIAL | TEST PROBE |
| INTERCONNECT COMPONENT GROUPING | |
| INTERCONNECT DESIGN INFORMATION ASSIGNMENT TO USAGE VIEW | |
| INTERCONNECT INTERFACE COMPONENT | |
| INTERCONNECT MARKING | |

FIG. 2

MULTI-DISCIPLINE UNIVERSAL CAD LIBRARY

BACKGROUND

The present invention relates to a web-based system for facilitating computer-aided design activities, and more particularly, the present invention relates to a web-based system for facilitating multi-disciplinary collaboration activities related to computer-aided design (CAD) processes.

Coordinating the engineering processes involving multiple CAD disciplines requires much planning. For example, in a typical electromechanical product design system, engineering processes are separately carried out in parallel by electrical and mechanical engineering disciplines—often in different organizations and/or geographic locations. Various software tools are available with which these engineers can design a product or component; however, these tools are primarily point solutions directed toward a single discipline (e.g., electrical, or mechanical design) and are not compatible with one another. The software required for each discipline varies dramatically due to the unique skills required and data utilized by each discipline. As a result, electrical engineers and mechanical engineers working on the same component are unable to effectively exchange information or collaborate on these designs utilizing existing tools. For example, the electrical designer of circuit assemblies is responsible for determining placement of components on a circuit board in the most desirable and effective manner. Electrical engineers are also responsible for design decisions affecting signal clarity, timing, input/output interfaces, and cooling/heat matters. Thus, ECAD software must address these functions. The mechanical or packaging engineer, on the other hand, is concerned with the physical size and shape of the circuit card, method and area required to mount the card within an enclosure or assembly, related connectors for the card, optimum airflow determinations for the card and system cooling. Thus, MCAD software on the market is designed to assist with these unique mechanical design functions.

Another reason why the two disciplines have been unable to share information is because of the lack of neutral data formats utilized by these disciplines; that is, the data stored by each discipline is defined by that discipline in its unique software format and stored in that discipline group's database or directory/environment accordingly. The mechanical designers using a common design system are able to communicate and collaborate amongst themselves, but it is difficult for them to make their data available to others due to uncommon units of measurements, naming conventions, etc. This impacts the activities of the electrical designers who also define the data they use in a format or convention not recognized by the same disciplines and/or other disciplines. In some cases, the transition of data from one area to another is done by paper drawings which requires total reentry of the data. The reentry increases costs, as it requires time to complete. The reentry process also provides the opportunity for error insertion during the transcription. This leads to increased product development cycle time for new and modified designs.

To date, there are several de-facto, industry, national and international standards available which provide some point solutions. De-facto standards such as AutoCAD Drawing Exchange Format (DXF) and Gerber Plotter data format facilitate some geometric data exchange. There are also industry standards such as those from the Institute of Interconnecting and Packaging Electronic Circuits (IPC) and Electronics Industries Alliance (EIA) which provide some discipline dependent data interchange. National standards such as Initial Graphics Exchange Specification (IGES), a United States CAD/CAM data exchange standard; Intermediate Data Format (IDF), an electrical card/board exchange standard; and Vereinung Deutsche Automobilindustrie Flachen Schnittstelle (VDAFS), a German neutral file format for the exchange of surface geometry, broaden the scope of data exchange to more than geometry. There are international standards such as Standard Generalized Markup Language (SGML), Electronic Data Interchange Format (EDIF), and the ISO Standard for the Exchange of Product (STEP) model data which increase the data scope and the audience even further.

However, the problem with these standards is that they are point solutions and solve only part of the problem. For example, geometric data standards allow for the transfer of geometry between disciplines, but many properties and annotation get lost. Drawing exchange allows for the transfer of more information, but still the picture is incomplete. EDIF, IPC and EIA are electrical design-centric solutions which cause loss of analysis, product data management (PDM), and mechanical information. IDF covers MCAD and ECAD functions but does not provide communication and issue tracking structures required for collaboration and offers little PDM.

As a result of these disparities, current practices for manufacturing enterprises which deal in electrical and mechanical design of circuit boards and other electronic components typically involve a 'ping pong' approach in which one or more engineering groups transfer a product in design stage back and forth amongst one another. For example, a typical design scenario may be described as follows:

An electrical card/printed circuit board (PCB) design starts in the mechanical CAD system where the overall size and shape are modeled. The board outline is modeled and critical components (such as LED's that must be aligned with a hole in a casing or board edge connectors or connector footprints) are pre-placed.

The mechanical designer may also define technology rules and electrical placement constraints which are represented by the functional areas such as placement or routing areas, keep in and keep out areas based on the physical constraints of the enclosure (the printed circuit board (PCB) designer can also define or modify the restrictions).

The board is then transferred to the PCB layout editor which performs placement of the components indicated by the MCAD designer and all remaining components. Changes can be made over the areas which support electrical information. Routing is done to convert the logical net list to a physical wiring of the net list. The design is then passed back to the mechanical system, where 3D modeling of the board is performed and definitions of the annotations for electrical references are provided.

This completed PCB design is used to check for alignment with a slot connector, as well as to perform interference analysis in order to see if the board and its components fit with the casing and/or adjacent PCBs.

After interference or fit analysis, modifications of the board may be necessary. In order to correct interferences, the mechanical engineer may either modify or create a placement keep out height and pass this information back to the PCB designer or may directly move the components in agreement with the design. A check is performed by mechanical engineering to determine the level of design integrity before the design is transferred back to the PCB environment where a revised placement and routing process will be performed, and so on.

While a product design project is being transferred back and forth between electrical and mechanical engineering groups, providing accurate data exchange is critical. Many different types and forms of data are utilized in the design process which creates a burden on inter-disciplinary design functions. For example, some types of circuit cards can be populated with components on either side of the card, and in some cases, on both sides of the card. It is quite often the case that when both sides of the card are used, each side of the card will provide different design criteria (e.g., keep outs, connectors, etc.). The main areas of inter-disciplinary data exchange typical in the electromechanical design process include: board outline, card thickness, airflow analysis, mounting hole locations, connector footprint, restricted areas, cooling recommendations, standard component shapes (some with added heatsinks and hole patterns), and placement, all of which are described further herein.

What is needed are neutral data definitions and representations which can be used collaboratively by disparate systems. The data definitions should not only allow the transfer of information between disciplines and engineering groups of disparate systems, but should also track the information and be able to segregate it into discipline views while keeping all of the views related to common meta data which define the overall product.

SUMMARY

The multi-discipline universal CAD library tool overcomes or alleviates the shortcomings of the prior art by providing a system for facilitating design and production engineering processes in a multi-disciplinary computer aided design environment. The system comprises
   a first enterprise including:
      a first workstation running a CAD application relating to a first engineering discipline; a second workstation running a CAD application relating to a second engineering discipline; a first storage device coupled to the first workstation; a second storage device coupled to the second workstation; a server; and a network connection for allowing the first workstation, the second workstation, and the server to communicate; wherein the server executes a multi-discipline universal CAD library application for sharing CAD data relating to component parts and design processes.

The system also includes a communications link to a second enterprise for allowing the second enterprise to communicate with the first enterprise and a commercial database accessible to the first and second enterprises via the communications link. The multi-discipline universal CAD library application facilitates data exchange and collaboration between the first and second enterprises by providing an interface between multi-disciplinary and/or disparate CAD applications through the use of standardization processes and definitions.

BRIEF DESCRIPTION OF THE DRAWINGS

FIG. 2 is a table representing the data exchange elements utilized by the multi-discipline universal CAD library tool.

DETAILED DESCRIPTION OF THE PREFERRED EMBODIMENT

Figure 1:
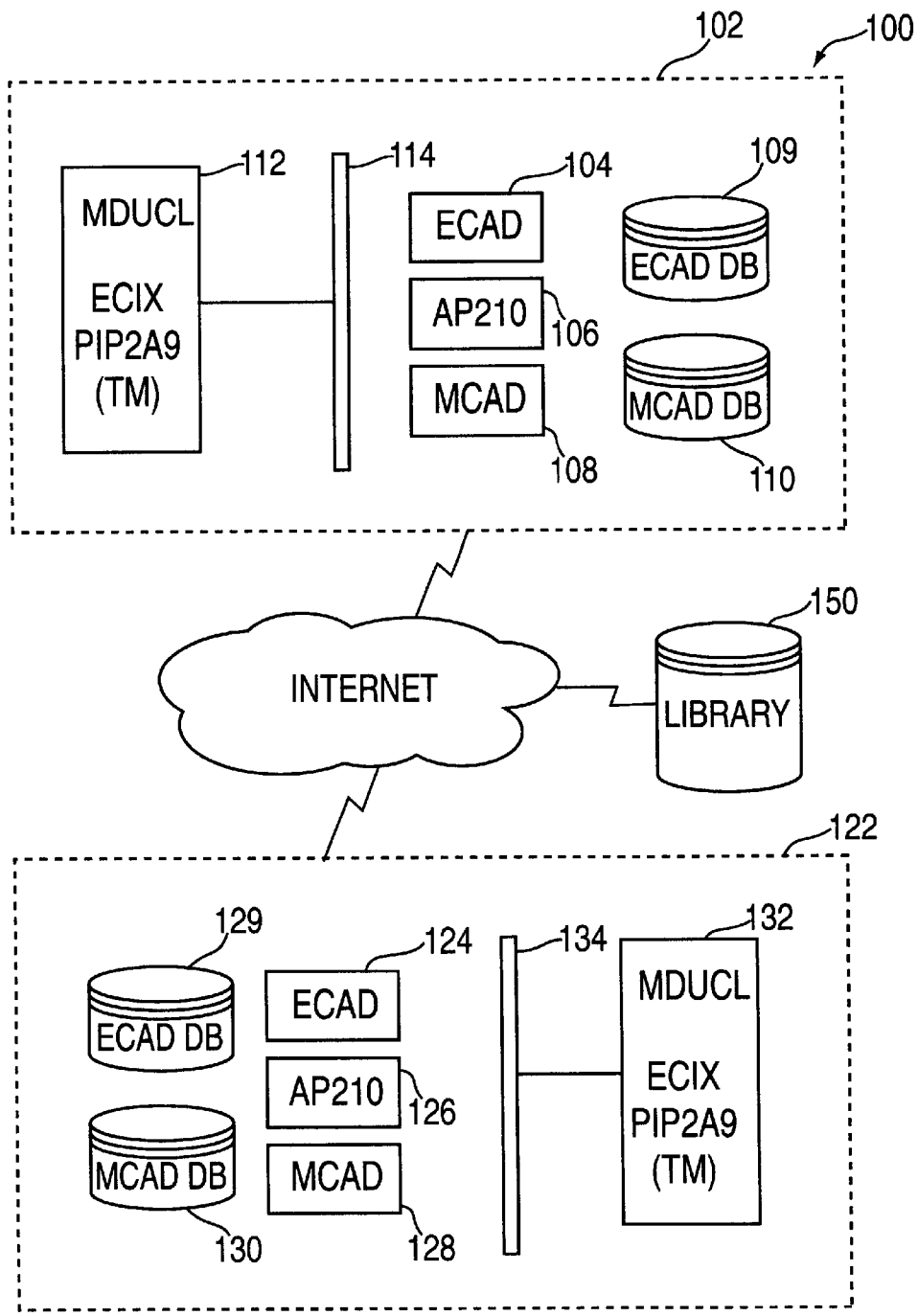
FIG. 1 is an exemplary block diagram of a portion of a network system upon which the multi-discipline universal CAD library tool is implemented.

The multi-discipline universal CAD library improves and facilitates computer-aided design processes including electronic products and modules by enabling the integration of disparate electrical and mechanical design data and procedures through its interface and library management tool.

The multi-discipline universal CAD library tool allows for data exchange and collaboration between multi-discipline engineering groups where data formats and/or computer systems are incompatible with one another. Although the invention may facilitate computer aided design for any type of engineering, this description focuses on electrical and mechanical groups for simplification and illustration purposes. In the printed circuit assembly (PCA) engineering community, data exchange areas capable of being shared via the tool include conversion of board shape, board thickness, airflow analysis data, connector footprints, restricted areas, cooling recommendations, component shapes and hole patterns (including associated mechanical features such as a heatsink), and component placement described as follows:

Board Outline. The board outline defines the geometric shape representation on the board and includes any cutouts that occur on or within the outline. It can be possible that the boards which make up a printed circuit card could have different outlines/shapes. At present, electronic design automation (EDA) utilizes 2 or 2.5 dimensional shape information for board geometry. Mechanical design automation (MDA) prefers to use boundary representation solids for these shapes. Conversion of board shape will be necessary where design changes affect board shape.

Card Thickness. Often circuit cards are created with multiple layers. Increasing the number of layers increases the overall board thickness. The thickness of the board must be exchanged. In the EDA environment, this may be represented as a parameter. In the MDA environment, this information will be an inherent property of the solid model.

Airflow Analysis. To perform critical airflow analysis it is often necessary to transfer 3D information to an airflow analysis tool. This transfer of data takes time and today, in some cases, involves the re-input of the data.

Mounting Hole Locations. These are areas which must be reserved for the attachment of the circuit board to the product. The circuit board attachment is quite often done by using screws and standoffs. The area that must be reserved may be larger than the hole itself. This is because the hardware used in the mounting process is larger than the hole. It is therefore necessary for the main area to be defined using either a circle or square. Crosshatch patterns imply the area which cannot be used for component placement or wiring. The area defined is also considered as a 'keep out'.

Connector footprint. The connector footprint consists of two pieces of information. One, the hole pattern which must be drilled in the card to accommodate the connector's electrical and mechanical connection to the board. And two, the keep out area for the connector. The hole pattern size/shape are defined using tiny circles. This pattern is quite often an industry standard and can be retrieved and used as a template. The keep out area is defined by a crosshatched shape.

Restricted Areas. Restricted areas are areas that should not contain components and or wiring. There can be varying reasons for these forbidden areas. Some example reasons are electromagnet interference, radio frequency emissions or mechanical interferences. These types must be indicated along with the reason for restriction.

Cooling Recommendations. Circuit cards are quite often cooled by air. The air movement commonly originates from a muffin type fan and moves across the card. It is therefore important when using cooling devices to know the air speed and direction. This will help place hotter components and to align components and fins of a heat sink properly to provide maximum airflow.

Standard Component Shapes and Hole Patterns. In electronic design, many, if not all, components used are packaged to standard dimensions and hole patterns. It should be possible for shape data to be determined by simply knowing the package type. Since these shapes are standard, the part number and package identifier can be used to relay the component shape between EDA and MDA. At present, EDA utilizes 2 or 2.5 dimensional shape information. MDA prefers to use boundary representation solids for these shapes. The component identification can be used to alternate between these shapes as models are interchanged.

Placement. Component placement data shall be interchanged. This placement may initially be of just critical components but will evolve over the course of the design to be the full placement of all packaged components.

The universal CAD library tool not only enables MCAD and ECAD systems to communicate and collaborate, but also to modify or alter their systems unilaterally without affecting the partner system because the standards utilized provide a buffer to the tool. This results in reduced product development cycle time, minimizes physical prototyping of design components, enables re-use of design data, and improves data integrity.

FIG. 1 illustrates a network system within which the multi-discipline universal CAD library tool may be implemented in a preferred embodiment of the invention. System 100 includes an enterprise 102, comprising an ECAD client 104 coupled to a database 109, an MCAD client 108 coupled to a database 110, and a server 112, all of which are in communication with one another via a network connection 114. Clients 104 and 108 may be workstations such as personal computers, laptops, or other similar devices and each include an input device, a processor, a memory, a monitor or screen, and a modem. Clients 104 and 108 are also operating software capable of accessing applications stored on server 112, communicating with other clients and peripheral devices in the system, as well as with clients outside of system, either via email software, web browser software, or other similar communications software known in the art. Client system 104 is running electronic CAD software for designing products or components and stores its information in database 109. Database 109 also stores component parts definitions used by the ECAD software. Similarly, MCAD client system 108 is running mechanical CAD software for assisting in its engineering functions and stores its information in database 110 which also stores component parts definitions used by the MCAD software. Server 112 is running web server software and applications software including the multi-discipline universal CAD library software tool of the present invention. Other features of enterprise 102 are explained further herein.

Enterprise 122 is configured similar to 102 except that its ECAD and MCAD software applications need not be compatible with those running on clients 104 and 108 of enterprise 102. Any number of clients may be utilized by enterprises 102 and 122, although only four clients 104, 108, 124 and 128 are shown in FIG. 1. Also, servers 112 and 132 need not be separately located from clients 104, 108, 124, and 128 respectively, but clients 104, 108, 124, and 128 may employ server software internally for running these applications.

Enterprises 102 and 122 communicate via a network connection such as the Internet. Enterprises 102 and 122 may be divisions of the same organization collaborating on the design of a product or may be separate organizations whereby one of enterprises 102 and 122 is providing CAD assistance to the other of enterprises 102 and 122 under an agreement. In this manner, the two enterprises 102, and 122 may be communicating via a virtual private network (VPN), extranet connection, or other similar network connection known in the art. Enterprise 102 may be any commercial or non-commercial enterprise engaged in CAD services and may be an electronics manufacturer.

System 100 also includes library 150 which may be a commercial database housing CAD data accessible to either or both of enterprises 102 and 122. Services of library 150 may be offered to either or both of enterprises 102 and 122 by an Applications Service Provider (ASP) under a contractual arrangement. This library 150 may be used by either or both of enterprises 102 and 122 in order to supplement its existing in-house libraries or databases 109, 110, 129, and 130 respectively. The multi-discipline universal CAD library application is an interface and library management tool which supports the newly-developed STEP AP210 standard (as well as other ECAD/MCAD interchange standards) and ECIX Quickdata (also known as RosettaNet (PIP2A9)) standards. These standards are incorporated into system 100 and are shown generally at 106, 112, 126, and 132. ECIX, or Electronic Component Information eXchange initiative was developed by Silicon Integration Initiative, Inc. (Si2), an organization of industry-leading silicon systems and tool companies focused on improving productivity and reducing costs in creating and producing integrated silicon systems. ECIX is a program formed by Si2 to provide a seamless flow of component information in both computer- and human-sensible format from suppliers to end-use customers exploiting the latest media distribution technologies. As part of this program, Si2 developed Quick-Data as a protocol specification defining rules and methods to enable a standard way for customers and suppliers to communicate in real-time via the Internet. It uses HTTP and CGI Post for protocol and messaging. QuickData lets engineers drop parts directly into schematics, since QuickData provides real-time access to parameterized data on vendors' Web sites. Engineers can quickly find the latest components and design them directly into products. Partner Interface Processes, (PIPs), were developed by RosettaNet, a non-profit consortium of more than two hundred companies, which define business processes between supply chain companies, providing them models and documents for the implementation standards. PIPs fit into six Clusters, or groups of core business processes, representing the backbone of the supply chain. Each cluster is further broken down into enterprise-oriented processes. PIP2A9's "Query Electronics Components Technical Information" allows customers to retrieve data from suppliers' databases; access to EDA software in different formats, including Verilog, VHDL and TDML. The PIP2A9 specification document, "Query Electronics Components Technical Information" is incorporated herein by reference in its entirety. RosettaNet has adopted ECIX QuickData format as its protocol standard.

The multi-discipline universal CAD library tool extracts data from design tool datasets, generates PIP2A9 transactions and standard data exchange (e.g., STEP AP210—Electronic Assembly, Interconnect, and Packaging Design)

data structures. The AP210 (or other standard) data exchange elements are utilized by the multi-discipline universal CAD library interface listed in FIG. 2. The information interchanged or accessed in the electro-mechanical design of printed circuit assemblies comes from three generic sources: MCAD systems 108, 128, ECAD systems 104, 124, and libraries such as those stored in databases 109, 110, 129, 130, and 150.

The multi-discipline universal CAD library tool uses as input the source dataset defined by the MCAD design software running on clients 108 and 128 which includes the information from design creation and may be further constrained by the data exchange elements defined above in FIG. 2. The tool's interface provides a mechanism to allow for the populating of product identification, product structure and engineering change data structures in standardized format. This information may be user supplied or, preferably, the information will utilize input datasets from other tools to support the populating of additional entities and attributes as defined by the standard data exchange specifications.

The multi-discipline universal CAD library tool uses as input the source dataset defined by the ECAD design software running on clients 104, 124 which includes the information from design creation, placement and routing functions and may be further constrained by the elements defined above in the data exchange requirements list of FIG. 2. The tool's interface provides a mechanism to allow for the populating of product identification, product structure and engineering change data structures in STEP or other standard format. This information may be user supplied, or preferably, the input datasets from other tools will be utilized to support the populating of additional entities and attributes as defined by the standard data exchange specifications.

As described above, both MCAD and ECAD systems such as clients 104, 108, 124, and 128 typically have associated libraries or product model registries. These libraries may be stored locally in databases 109, 110, 129, 130 or may be a commercial database 150. The tool's interface exploits MCAD and ECAD associated libraries and extends them into the virtual World Wide Web virtual environment through the use of ECIX Quickata/PIP2A9 (TM) procedures. The end result is one virtual library access for MCAD and ECAD data which will utilize ECIX Quickdata/PIP2A9 (TM) as its interface. With little or no extension, this tool's interface can be extended beyond its current electronic component intent to provide a generic library interface for any type of component. The universal CAD library tool will accept ECIX Quickdata/PIP2A9 (TM) queries and return the requested component information in the STEP and/or ECIX Quickdata/PIP2A9 (TM) format based on the request response content. STEP format would be used for all geometric information.

The universal CAD library tool may then be used as a homogeneous interface for interchange-in-place of electrical, mechanical and other component parameters. This would allow for multi-disciplinary system interchange of component references without the actual interchange of the components themselves. This process is further described herein.

The entities, entity relationships, and attributes contained in the ECIX/AP210 data transactions shall be defined by the standard specifications. The data shall support AP210 or standard information elements as shown in FIG. 2. Other information elements may be added to this list as desired by system users with proper authorization. The format of the AP210 or standard information when stored in a file shall be as defined in ISO 10303-21:1994 (Clear Text Encoding of the Exchange Structure (for STEP)) with all currently applicable corrigenda. The format of the AP210 information when stored in XML shall be as defined in ISO 10103-28 (XML representation for Express driven data) with any currently applicable corrigenda. Active access to AP210 or standard objects shall be achieved through XML or through ISO 10103-22 SDAI language bindings (C, C++, IDL or JAVA(TM)).

The architecture of the universal CAD library tool as shown in FIG. 1 may be a blind interface in that the ECAD and MCAD system interfaces are coded to AP210 or other standard interchange formats and PIP2A9 (TM). This would eliminate the need for concurrent mapping sessions, as each system will map its data to these standards.

Each ECAD/MCAD interface should take into account both new inbound information and information which is an update to existing designs. The latter is more challenging since changes must be detected and interlaced back into the currently stored design on the target system as a new revision. The actual methods for detecting and interlacing changes will be left to the individual CAD system interface architects. Preferably, an incoming change is interlaced into an incumbent design as a proposed new version with the absolute minimum loss of information. The recognition that a change is a perturbation of an existing design may be done through the standard product identification and engineering change structures.

Both ECAD and MCAD interfaces will be responsible for their own data conversions for the sent design and any library components it utilizes. When a system detects a component which is not in its library, it attempts to retrieve the component information through PIP2A9 transactions. Where PIP2A9 information is received, the system issuing the transaction will be responsible for any conversion between the PIP2A9 information and the native library format. If the web library has no information for the component, a warning will be issued and a placement for the component shall be recorded so that the component geometry can be accurately located when it is available.

It should be noted that the invention is not limited to the design and manufacturing of printed circuit assemblies but may also be employed in any CAD project. Thus, the implementation of the invention as it pertains to PCAs has been described for purposes of illustration only.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A system for facilitating design and production engineering processes in a multi-disciplinary computer aided design environment, comprising:
    a first enterprise including:
        a first workstation executing a CAD application relating to a first engineering discipline;
        a second workstation executing a CAD application relating to a second engineering discipline;
        a server in communication with said first workstation and said second workstation via a network connection;
        a universal CAD library application executing on said server; and
    a communications link to a second enterprise;
        wherein said universal CAT) library application performs:
            extracting data from a design tool dataset associated with a CAD application horn a first engineering discipline;
        converting said data into a neutral format; and
        upon accessing said data by a second CAD application, converting said data to a format recognizable by a second CAD application from a second engineering discipline, said converting performed by:
        generating at least one ECIX Quickdata PIP2A9 transaction; and
        generating standard data exchange data structures;
        wherein said at least one ECIX Quickdata PIP2A9 transaction includes a standardized enterprise-oriented business process, model, and protocol.

2. The system of claim 1, wherein said standard data exchange data structures comprise STEP AP210 data exchange elements.

3. The system of claim 1, further comprising:
    a link to a vendor's web site via said network connection wherein said universal CAD library application accesses component data from said vendor's web site and designs said component data directly into a CAD design.

4. The system of claim 1, further comprising a link to a commercial database of component information;
    wherein said universal CAD library application issues a warning when a component cannot be located in said commercial database; and
    wherein further, a placement for said component is recorded for subsequent location of an associated component geometry when component becomes available.

5. A method for facilitating design and production engineering processes in a multi-disciplinary computer aided design environment over a network connection, comprising:
    extracting data from a design tool dataset associated with a CAD application from a first engineering discipline;
    converting said data into a neutral format; and
    upon accessing said data by a second CAD application, converting said data to a format recognizable by said second CAD application from a second engineering discipline, said converting performed by:
    generating at least one ECIX Quickdata PIP2A9 transaction; and
    generating standard data exchange data structures;
        wherein said at least one ECIX Quickdata PIP2A9 transaction includes a standardized enterprise-oriented business process and protocol operable for enabling communications between said first enterprise and said second enterprise.

6. The method of claim 5, wherein said standard data exchange structures camp rise STEP AP210 data exchange elements.

7. The method of claim 6, further comprising:
    retrieving component information over said from a commercial database when said component information cannot be located in said design tool dataset;
    wherein said universal CAD library application issues a warning when a component cannot be located in said commercial database; and
    wherein farther, a placement for said component is recorded for subsequent location of an associated component geometry when said component becomes available.

8. The method of claim 5, further comprising:
    providing component information to said second engineering discipline resulting from said conversion, said component information including at least one of:
    product identification;
    product structure; and engineering change data.

9. The method of claim 5, farther comprising:
    accessing component data from a vendor's web site; and
    incorporating said component data directly into a CAD design.

10. A storage medium encoded with machine-readable computer program code coy facilitating design and production engineering processes in a multi-disciplinary computer aided design environment over a network connection, said storage medium including instructions for causing a server to implement a method comprising:
    extracting data from a design tool dataset associated with a CAD application from a first engineering discipline;
    converting said data into a neutral format; and
    upon accessing said data by a second CAD application, converting said data to a format recognizable by said second CAD application from a second engineering discipline, said converting performed by:
    generating at least one ECIX Quickdata PIP2A9 transaction; and
    generating standard data exchange data structures;
        wherein said at least one ECIX Quickdata PIP2A9 transaction includes a standardized enterprise-oriented business process and protocol operable for enabling communications between said first enterprise and said second enterprise.

11. The storage medium of claim 10, wherein said standard data exchange structures comprise STEP AP210 data exchange elements.

12. The storage medium of claim 11, further comprising:
    retrieving component information over said from a commercial database when said component information cannot be located in said design tool dataset;
    wherein said universal CAD library application issues a warning when a component cannot be located in said commercial database; and
    wherein further, a placement for said component is recorded for subsequent location of an associated component geometry when said component becomes available.

13. The storage medium of claim 10, further comprising:
providing component informal ion to said second engineering discipline
resulting from said conversion, said component information including at least one of:
  product identification;
  product structure; and
  engineering change data.

14. The storage medium of claim 10, further comprising:
accessing component data from a vendor's web site; and
incorporating said component data directly into a CAD design.

* * * * *